H. C. CARR.
Potato Digger.
No. 100,854.   Patented March 15, 1870.
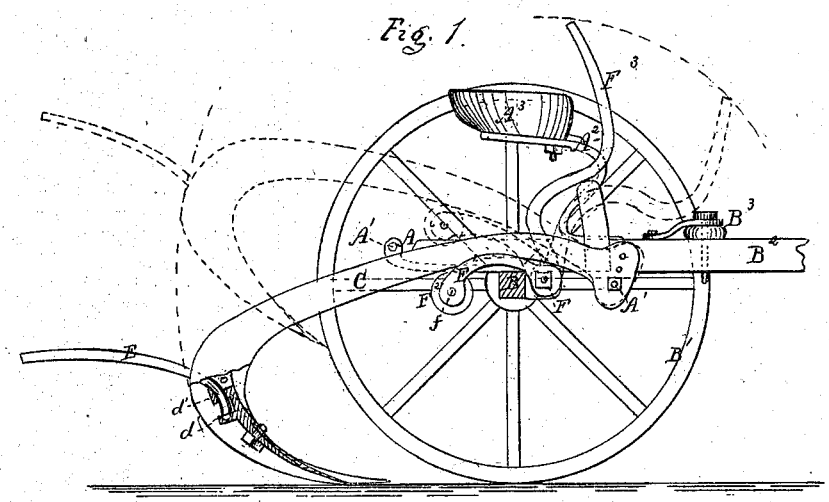
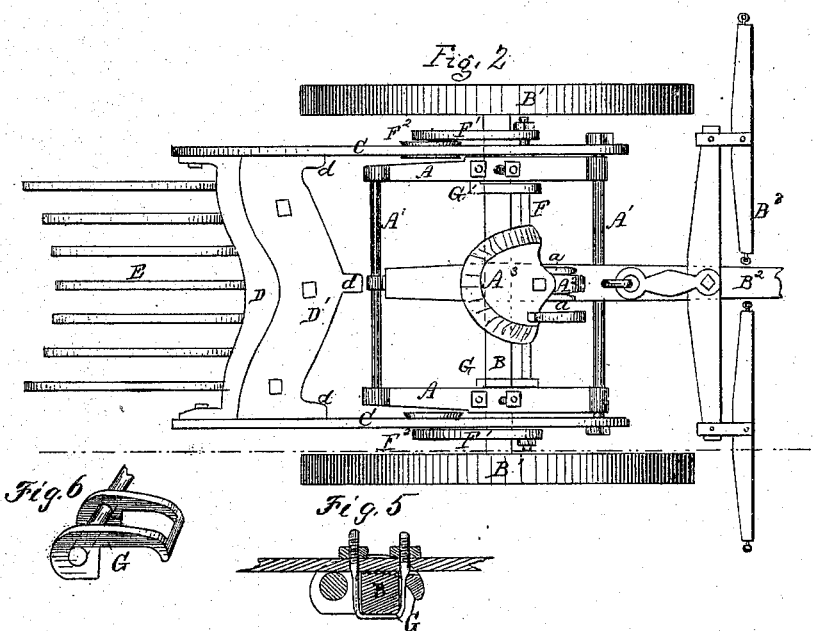
Attest
P. Eder, J. Eibs
C. F. Clausen
Inventor
Henry C. Carr
per Edson Brothers
his Attys

007~# UNITED STATES PATENT OFFICE.

HENRY C. CARR, OF BORDENTOWN, NEW JERSEY.

IMPROVEMENT IN POTATO-DIGGERS.

Specification forming part of Letters Patent No. 100,854, dated March 15, 1870.

*To all whom it may concern:*

Be it known that I, HENRY C. CARR, of Bordentown, in the county of Burlington and State of New Jersey, have invented a new and Improved Potato-Digger; and I do hereby declare that the following is a full, clear, and exact description thereof, reference being had to the accompanying drawings, and to the letters of reference marked thereon.

Figure 1 is a side elevation showing the potato-digger. Fig. 2 is a plan view thereof. Figs. 5 and 6 show the construction of the devices which form the bearings of the rock-shaft, by which the depth of the digger is determined.

Similar letters denote like parts in each of the figures.

My invention consists in elevating the adjustable arm of a potato-digger, arranged in rear of the carriage, by means of a rock-shaft, curved arm, and operating-lever, all under control of the driver.

To enable those skilled in the art to which my invention relates to make and use the same, I will proceed to describe its construction and operation.

In the annexed drawings, A represents the frame of the machine, to which the digger is to be attached. It consists of three or more parallel bars of metal or other suitable material, the ends of which are provided with eyes through which to pass stay-bolts A', for the purpose of securing such bars together. The frame thus constructed is secured to the axle B by means of clips in the ordinary manner, such axle having its bearings in the hubs of carrying-wheels B'. The center bar of the frame has, near its forward end, two vertical lugs, *a a*, for the purpose of giving steadiness to the draft-pole, which is attached to this bar, passing between such lugs, and upon which the spring-seat A³ is mounted in the proper place. The forward stay-bolt A' projects a short distance through the bars of the frame at each end, and to the ends of this bolt the potato-digger is attached.

C C represent the side bars of the digger, extending from the forward bolt A', to which they are attached, over the axle of the machine, to the rear, and formed substantially as shown in Fig. 1. Their forward end is formed like a plow-clevis, so that the depth to which the digger shall enter the soil may to some extent be regulated. To the lower rear portions the digger D is secured, occupying the space between the side bars, and being inclined in the usual manner. The forward end of the digger is provided with a share, D', bolted or otherwise secured thereto, said share having suitable points, *d*, which cut the soil in advance, and enable it to enter more easily. Upon the under surface of the digger, and near its rear end, two downwardly-projecting flanges, *d' d'*, are formed, in which a series of holes are bored opposite each other, which holes are screw-threaded.

E represents the tines upon which the earth is separated from the potatoes before the latter are dropped at their rear end. They consist of a number of prongs, which are screwed at one end into the taps in the flanges *d' d'* of the digger.

F represents a rock-shaft arranged under the frame in front of the axle in bearings G. The rock-shaft is squared upon its ends, and carries two cranks, F' F', which extend to the rear, resting upon the axle. These cranks are arranged just outside of the side bars of the digger, and each carries on its outer end friction-rollers F², which are located directly under such side bars, and afford a support to them at that point. A lever, F³, is secured upon the rock-shaft, within convenient reach of the driver, by which it may be turned, so as to lift the digger entirely out of the ground, as indicated in dotted lines, Fig. 1 of the drawings.

G represents the bearing above alluded to, consisting of a band of iron bent into the form shown in Figs. 5 and 6, and provided with eyes in the ends of its jaws to receive the rock-shaft F. Each is to be passed over a side bar of the frame from the under side, and then turned down over the axle, after which the rock-shaft is passed through their eyes, passing under the bars of the frame.

It will be observed that the connecting-bar at the rear of the clip bears against the bar of the frame in rear of the axle, as the rock-shaft does in front, and that its jaws snugly embrace such bar, thus forming a firm support for the rock-shaft.

Having thus described my invention, what I claim as new, and desire to secure by Letters Patent of the United States, is—

The rock-shaft F, arms F', friction-rollers $F^2$, and the operating-lever $F^3$, in combination with the adjustable arm C of the potato-digger, substantially as herein described and set forth.

In testimony whereof I have signed my name to this specification in the presence of two subscribing witnesses.

HENRY C. CARR.

Witnesses:
 JOSEPH R. EDSON,
 J. JUDEFIND.